United States Patent
Eggers (10) Patent No.: US 10,483,836 B2
(45) Date of Patent: Nov. 19, 2019

(54) METHOD OF EARLY HARD SWITCHING DETECTION AND PROTECTION FOR INDUCTIVE POWER TRANSFER

(71) Applicant: Lear Corporation, Southfield, MI (US)

(72) Inventor: Kendall Eggers, West Bloomfield, MI (US)

(73) Assignee: Lear Corporation, Southfield, MI (US)

(*) Notice: Subject to any disclaimer, the term of this patent is extended or adjusted under 35 U.S.C. 154(b) by 186 days.

(21) Appl. No.: 15/663,989

(22) Filed: Jul. 31, 2017

(65) Prior Publication Data

US 2019/0036441 A1    Jan. 31, 2019

(51) Int. Cl.
| | |
|---|---|
| *B60L 53/12* | (2019.01) |
| *H02J 7/00* | (2006.01) |
| *H02J 50/20* | (2016.01) |
| *H02J 50/12* | (2016.01) |
| *H02M 1/08* | (2006.01) |
| *H02M 3/335* | (2006.01) |
| *H02M 1/00* | (2006.01) |

(52) U.S. Cl.
CPC ............ *H02M 1/083* (2013.01); *H02J 50/12* (2016.02); *H02M 3/33507* (2013.01); *H02M 2001/0058* (2013.01)

(58) Field of Classification Search
USPC ........................................................ 307/104
See application file for complete search history.

(56) References Cited

U.S. PATENT DOCUMENTS

| | | |
|---|---|---|
| 5,207,304 A | 5/1993 | Lechner et al. |
| 6,934,167 B2 | 8/2005 | Jang et al. |
| 7,880,337 B2 | 2/2011 | Farkas |
| 8,643,326 B2 | 2/2014 | Campanella et al. |
| 8,884,581 B2 | 11/2014 | Widmer et al. |
| 9,369,183 B2 | 6/2016 | Nejatali et al. |
| 9,729,084 B2 * | 8/2017 | Abraham ............ H02M 7/4807 |
| 10,090,884 B2 * | 10/2018 | Ettes .................... H04B 5/0031 |
| 2011/0254377 A1 | 10/2011 | Wildmer et al. |
| 2012/0032633 A1 | 2/2012 | Cordes et al. |
| 2014/0035525 A1 | 2/2014 | Vossberg et al. |
| 2015/0051750 A1 | 2/2015 | Kurs et al. |
| 2017/0229917 A1 * | 8/2017 | Kurs ....................... H02J 50/12 |

FOREIGN PATENT DOCUMENTS

EP    2868516 A1    5/2015

* cited by examiner

*Primary Examiner* — Rexford N Barnie
*Assistant Examiner* — Xuan Ly
(74) *Attorney, Agent, or Firm* — Brooks Kushman P.C.

(57) ABSTRACT

An inductive power transfer system includes a power converter and a controller. The power converter includes switches. The controller to switch the switches according to a schedule to cause the power converter to output a voltage and a current to a resonant network. The controller to compare a zero-current crossover point of the current and the schedule to determine whether the zero-current crossover point occurs prior to a scheduled time that one or more of the switches are be switched. The controller to disable the switches from switching when the zero-current crossover point occurs prior to the scheduled time such that the switches do not switch at the scheduled time thereby preventing hard switching of the switches from occurring.

10 Claims, 5 Drawing Sheets

METHOD OF EARLY HARD SWITCHING DETECTION AND PROTECTION FOR INDUCTIVE POWER TRANSFER

TECHNICAL FIELD

The present invention relates to inductive power transfer systems such as for wirelessly charging electric vehicles.

BACKGROUND

Wireless power transfer systems enable power to be transferred wirelessly from a source to a load. Inductive power transfer is a non-radiative, or near-field, type of wireless power transfer. Inductive power transfer uses an oscillating current passing through a primary coil (i.e., a transmit antenna) of a source to generate an oscillating magnetic near-field that induces currents in a secondary coil (i.e., a receive antenna) of a load. The source includes a power converter having power transistor switches which switch at controllable times to convert power of the source into the oscillating current passing through the primary coil.

Inductive power transfer is performed to wirelessly charge a load, such a traction battery of an electric vehicle, using power from the source. In such wireless electric vehicle charging systems, the transmit antenna of the source is embedded in a "charging" mat and the receive antenna (and an associated rectifier) is embedded in a designated location of the vehicle. The inductive power transfer involves inductive coupling between the antennas. For inductive power transfer to be efficient, the spacing between the antennas must be relatively close within small offset tolerances.

Inductive power transfer systems require a balance of trade-offs between resonant tuning (Q), antenna coupling, amount of coil turns of the antennas, size of the coils of the antennas, antenna coil separation offset range, and power transistor switch types that can automatically startup and operate in non-damaging, soft-switching modes of operation, given a specified load range. This balance was met by using antennas having a large physical form factor.

Specifications have aggressively reduced the allowed antenna size (i.e., the antennas are to be smaller) and increased the antenna separation offset range (i.e., the inductive power transfer system is to work with the antennas being positioned a bit farther apart). These specifications have forced resonant network tuning and operation to run near or even exceed soft-switching mode boundaries and into undesirable hard-switching modes. Hard-switching in these high current resonant networks can cause the efficiency of the inductive power transfer system to drop significantly. If the hard-switching is severe enough, then power dissipation may be increased beyond what the power transistor switches and/or system thermal design are capable of withstanding.

SUMMARY

An inductive power transfer system includes a power converter and a controller. The power converter includes switches. The controller is to switch the switches per a schedule to cause the power converter to output a voltage and a current to a resonant network. The controller is to compare a zero-current crossover point of the current and the schedule to determine whether the zero-current crossover point occurs prior to a scheduled time that one or more of the switches are be switched. The controller is to disable the switches from switching when the zero-current crossover point occurs prior to the scheduled time such that the switches do not switch at the scheduled time thereby preventing hard switching of the switches from occurring.

The controller may confirm that soft switching of the one or more switches is occurring when the zero-current crossover point occurs after the scheduled time that the one or more switches are switched.

An inductive power transfer method includes switching a plurality of switches of a power converter per a schedule to cause the power converter to output a voltage and a current to a resonant network. The method further includes comparing a zero-current crossover point of the current and the schedule to determine whether the zero-current crossover point occurs prior to a scheduled time that one or more of the switches are be switched. The method further includes disabling the switches from switching when the zero-current crossover point occurs prior to the scheduled time such that the switches do not switch at the scheduled time thereby preventing hard switching of the switches from occurring.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
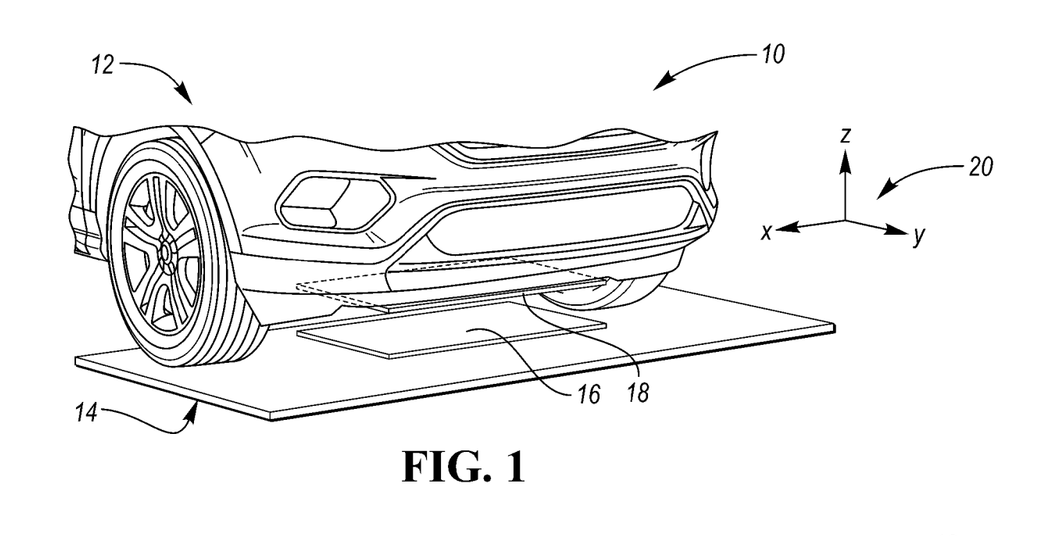
FIG. 1 illustrates a schematic diagram of an inductive power transfer system for wirelessly charging an electric vehicle with power from a charging base.

Referring now to FIG. 1, a schematic diagram of an inductive power transfer system 10 for wirelessly charging an electric vehicle 12 with power from a charging base 14 is shown. Charging base 14 includes a transmit antenna 16 positioned in the ground or on the floor of a structure. Vehicle 12 includes a receive antenna 18 mounted to the underside of the vehicle. Transmit antenna 16 and receive antenna 18 are aligned in close arrangement when vehicle 12 is properly parked. Power of charging base 14 can thus be transferred from transmit antenna 16 to receive antenna 18 for charging vehicle 12. Receive antenna 18 is connected to the traction battery or the like of vehicle 12. The power wirelessly transferred from charging base 14 to vehicle 12 is used to charge the traction battery.

A coordinate system 20 is also shown in FIG. 1. In coordinate system 20, transmit antenna 16 and receive antenna 18 are separated along the z-direction when vehicle 12 is parked over the transmit antenna. Vehicle 12 (particularly receive antenna 18) can be displaced relative to transmit antenna 16 along either the x-direction and the y-direction (i.e., relative to the ground or floor in which the transmit antenna is positioned). Displacement of receive antenna 18 from a preset optimal aligned position relative to transmit antenna 16 in any of the coordinate directions decreases the efficiency with which power can be wirelessly transferred from the transmit antenna to the receive antenna. In this regard, displacement of receive antenna 18 relative to transmit antenna 16 changes the impedance seen by the power generating component of charging base 14 that feeds the transmit antenna with power.

Figure 2:
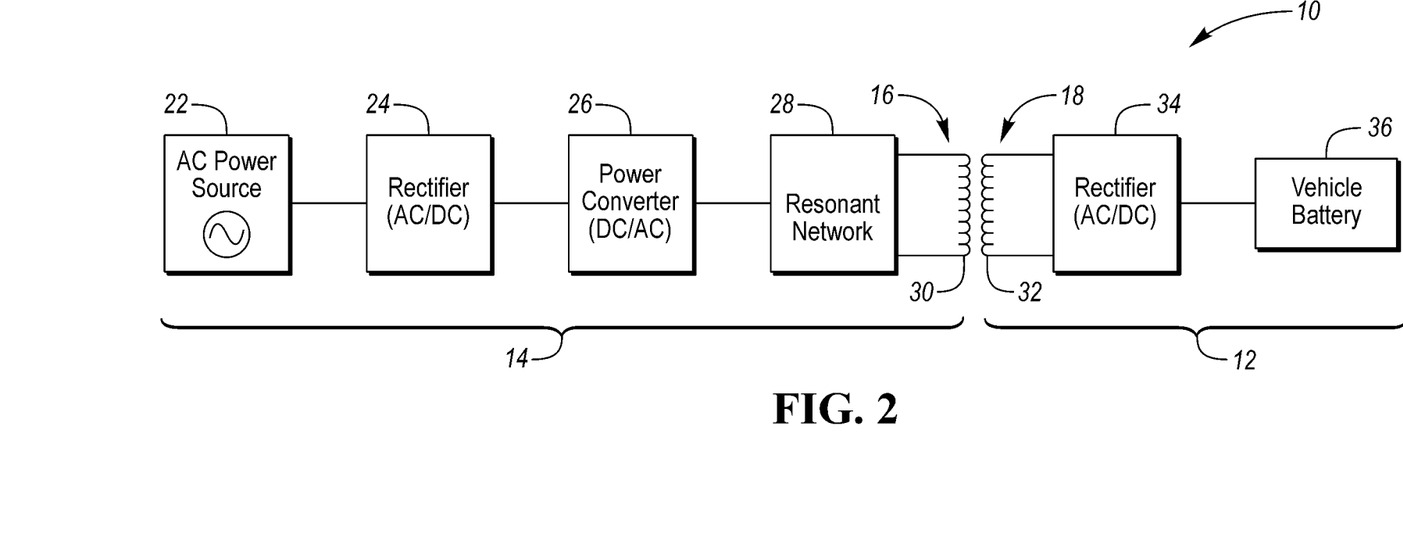
FIG. 2 illustrates a block diagram of the inductive power transfer system.

Referring now to FIG. 2, with continual reference to FIG. 1, a block diagram of inductive power transfer system 10 is shown. As shown in FIG. 2, in addition to transmit antenna 16, charging base 14 of inductive power transfer system 10 includes an AC (alternating current) power source 22, an AC/DC (alternating current/direct current) rectifier 24, a DC/AC power converter 26, and a resonant network 28. Power source 22 provides AC power to rectifier 24. Rectifier 24 rectifies the AC power to DC power and provides the DC power to power converter 26. Power converter 26 converts the DC power into LF (low-frequency AC) power and provides the LF power to resonant network 28.

Transmit antenna 16 includes one or more coils (i.e., primary coil 30). Receive antenna 18 of vehicle 12 includes one or more coils (i.e., secondary coil 32). Primary coil 30 and secondary coil 32 are physically arranged next to one another (i.e., "loosely coupled") when vehicle 12 is properly parked. That is, secondary coil 32 wirelessly couples with primary coil 30 when the secondary coil is in the coupling-mode region of the primary coil providing a mutual inductance M and resonating at substantially the same frequency as the primary coil. The LF power from power converter 26 passes through resonant network 28 and through primary coil 30 and causes the primary coil to generate an oscillating magnetic near-field. The oscillating magnetic near-field induces currents in secondary coil 32. The currents in secondary coil 32 generate LF power on the vehicle side. As such, an inductive coupling between primary coil 30 and secondary coil 32 occurs for inductive power transfer from charging base 14 to vehicle 12.

As further shown in FIG. 2, in addition to receive antenna 18, vehicle 12 includes an AC/DC rectifier 34. Rectifier 34 rectifies the LF power from secondary coil 32 into DC power. The DC power from rectifier 34 may be supplied to a load 36 of vehicle 12 such as a traction battery.

Resonant network 28 of charging base 14 includes various electronic components including one or more capacitors and one or more inductors. The electronic components are arranged in a predetermined configuration including a predetermined arrangement of components having predetermined values (e.g., capacitors having predetermined capacitance values and inductors having predetermined inductance values are in the configuration). The predetermined configuration is designed in conjunction with primary coil 30 so that resonant network 28 presents an optimal impedance to power converter 26 when primary coil 30 and secondary coil 32 are coupled. The optimal impedance includes an inductive reactance. The optimal impedance thereby enables optimal "resonant coupling" between primary coil 30 and secondary coil 32 with the inductive reactance component causing power transistor switches of power converter 26 to operate in the desired inductive or soft switching mode.

As indicated, displacement of secondary coil 32 relative to primary coil 30 changes the impedance seen by power converter 26. For example, the displacement may be from a person touching vehicle 12 causing the vehicle (and consequently secondary coil 32) to rock slightly after the vehicle was parked with primary coil 30 and secondary coil 32 in the preset optimal aligned position. If the displacement causes the positioning of secondary coil 32 and primary coil 30 to not be in compliance within a given tolerance of the preset optimal aligned position, then the reactance component of the impedance may become a capacitive reactance component. Consequently, the power transistor switches of power converter 26 will operate in the undesired capacitive or hard switching mode as will be described in greater detail below.

As another example, a metallic foreign object, such as an aluminum can, coupling with primary coil 30 affects the coupling between primary coil 30 and secondary coil 32. In this case, even with primary coil 30 and secondary coil 32 being in the preset optimal aligned position, the coupling between the foreign object and primary coil 30 changes the impedance seen by power converter 26. The reactance component of the impedance may thereby become a capacitive reactance component. Consequently, the power transistor switches of power converter 26 will operate in the undesired capacitive or hard switching mode as will be described in greater detail below.

Figure 3A:
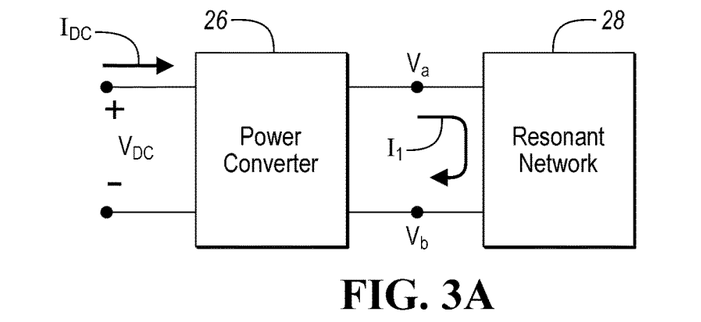
FIG. 3A illustrates a block diagram of a power converter and a resonant network of the charging base of the inductive power transfer system and the electrical power flow from the power converter into the resonant network.

Referring now to FIG. 3A, with continual reference to FIGS. 1 and 2, a block diagram of power converter 26 and resonant network 28 of charging base 14 and the electrical power flow from the power converter into the resonant network is shown. As described, power converter 26 receives DC power from rectifier 24, converts the DC power into LF power, and outputs the LF power to resonant network 28. The DC power received by power converter 26 from rectifier 24 includes a DC voltage ($V_{DC}$) and a DC current ($I_{DC}$). The LF power fed into resonant network 28 from power converter 26 includes a time-varying voltage ($V_{ab}$) and a time-varying current ($I_1$).

Figure 3B:
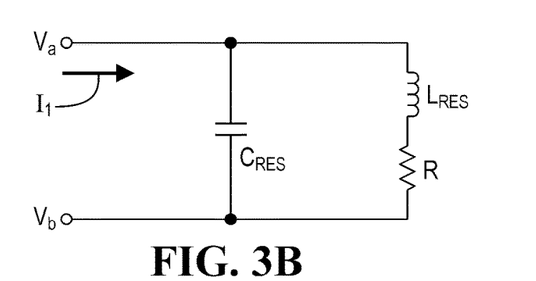
FIG. 3B illustrates a circuit diagram of the resonant network in the form of a parallel resonant network based on the primary coil of the charging base and the secondary coil of the electric vehicle being in a given coupling mode.
Figure 3C:
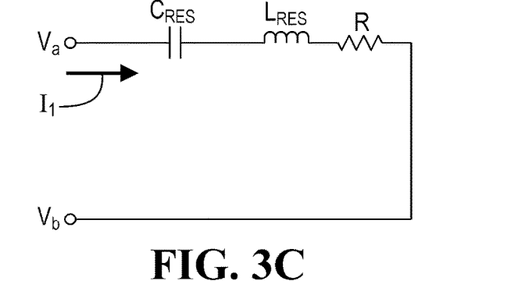
FIG. 3C illustrates a circuit diagram of the resonant network in the form of a series resonant network based on the primary coil of the charging base and the secondary coil of the electric vehicle being in a given coupling mode.

FIGS. 3B and 3C illustrate circuit diagrams of resonant network 28 in the form of a parallel resonant network and a series resonant network, respectively, based on primary coil 30 and secondary coil 32 being coupled in a given way. The circuit diagrams of resonant network 28 shown in FIGS. 3B and 3C include a lumped capacitance ($C_{RES}$), a lumped inductance ($L_{RES}$), and a resistance (R) which together form the impedance (i.e., resistance and reactance) of resonant network 28 when secondary coil 32 is coupled to primary coil 30 in the given way. The impedance of resonant network 28 depends on the predetermined configuration of the electronic components of the resonant network and the coupling between primary coil 30 and secondary coil 32.

Figure 3D:
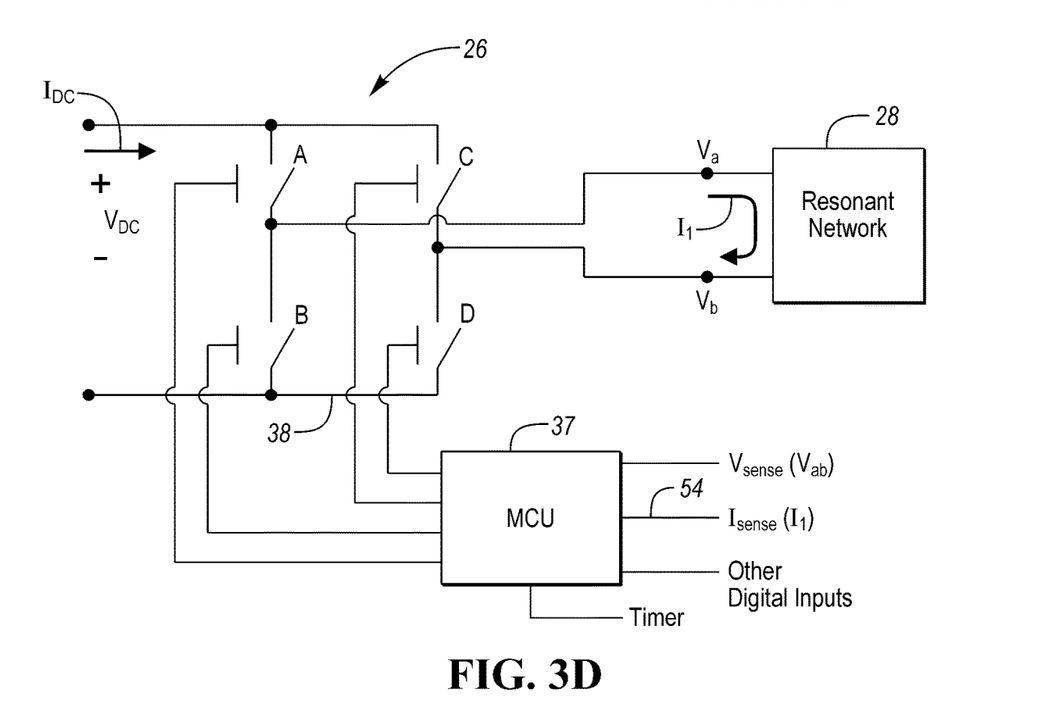
FIG. 3D illustrates a circuit diagram of the power converter, according to one embodiment, and the resonant network and the electrical power flow from the power converter into the resonant network.

FIG. 3D illustrates a circuit diagram of power converter 26, according to one embodiment, and resonant network 28 and the electrical power flow from the power converter into the resonant network. Power converter 26 in this embodiment is a full-bridge circuit 38. Full-bridge circuit 38 of power converter 26 includes four solid-state switches (i.e., transistors) A, B, C, and D. (In another embodiment, power converter 26 is a half-bridge circuit including two switches.) Switches A, B, C, and D include transistor switch types such as MOSFETs (Si or SiC MOSFETs), BJTs, FETs, IGBTs, etc.

A controller (e.g., microcontroller (MCU)) 37 is operable for individually controlling switches A, B, C, and D. Switches A, B, C, and D are assumed to be normally off (i.e., assumed to be normally opened as shown in FIG. 3D). Controller 37 controls switches A, B, C, and D to switch on (i.e., to close) and off according to a schedule to cause power converter 26 to convert the DC power from rectifier 24 into the LF power for resonant network 28. For example, switch pair A and D switches on and off together, switch pair B and C switches on and off together, and only one of the switch pairs switches on at any time. This switching of switches A, B, C, and D causes the voltage $V_{DC}$ and the current $I_{DC}$ from rectifier 24 to be converted into the voltage $V_{ab}$ and the current $I_1$ outputted from power converter 26. The voltage $V_{ab}$ and the current $I_1$ outputted from power converter 26 is the LF power fed into resonant network 28.

For a given voltage $V_{ab}$ fed into resonant network 28 from power converter 26, the current $I_1$ fed into the resonant network from the power converter depends on the impedance of the resonant network (i.e., I=V/Z, where Z is the impedance). As such, with the same voltage $V_{ab}$, the current $I_1$ changes as the impedance changes.

As indicated, inductive power transfer system 10 is designed such that the impedance has an inductive reactance component when primary coil 30 and secondary coil 32 are properly aligned in a preset optimal aligned position within a given tolerance with no undesired coupling with foreign objects. As the impedance has an inductive reactance component the current $I_1$ "lags" the voltage $V_{ab}$. Because of the current $I_1$ lagging the voltage $V_{ab}$, the switching of switches A, B, C, and D of power converter 26 occurs in the soft-switching mode. The soft-switching mode is desirable as switching losses are minimal.

A problem is that the design of inductive power transfer system 10 provides a minimal boundary for soft-switching mode operation because specifications have aggressively reduced the allowed sizes of primary coil 30 and secondary coil 32 and have increased the offset ranges between the coils. That is, the soft-switching mode of power converter 26 can give way to the capacitive or hard-switching mode for switches A, B, C, and D when secondary coil 32 is even just slightly off of the preset optimal aligned position with primary coil 30. For instance, if the impedance changes due to an external force moving vehicle 12 causing undesired displacement between primary coil 30 and secondary coil 32 or due to a foreign object coupling with primary coil 30 and/or secondary coil 32, etc., then the reactance component may change from an inductive reactance component to a capacitive reactance component. The change from the inductive reactance component to the capacitive reactance component causes the current $I_1$ to "lead" the voltage $V_{ab}$. Thus, switches A, B, C, and D will operate in the hard switching mode. The hard-switching mode is not desirable as relatively heavy switching losses will be present.

Figure 4A:
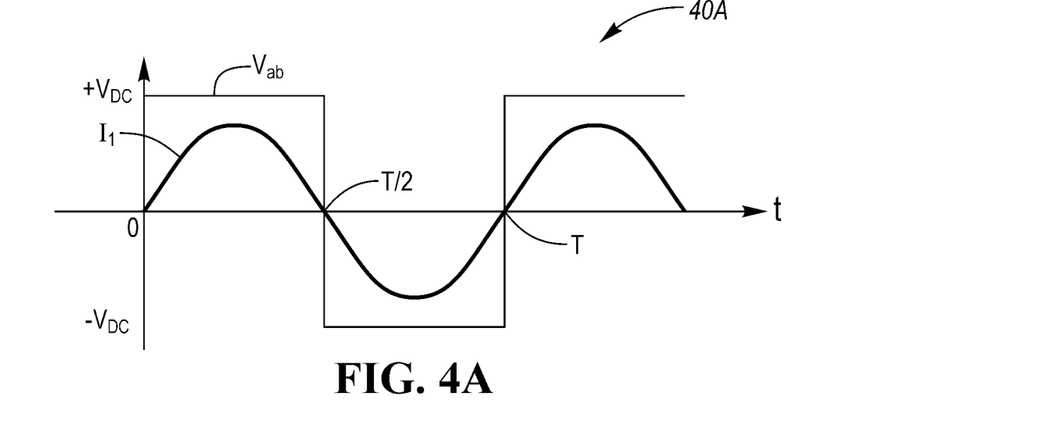
FIG. 4A illustrates a plot showing voltage and current waveforms of the electrical power flow from the power converter into the resonant network with the current waveform being completely in phase with the voltage waveform.
Figure 4B:
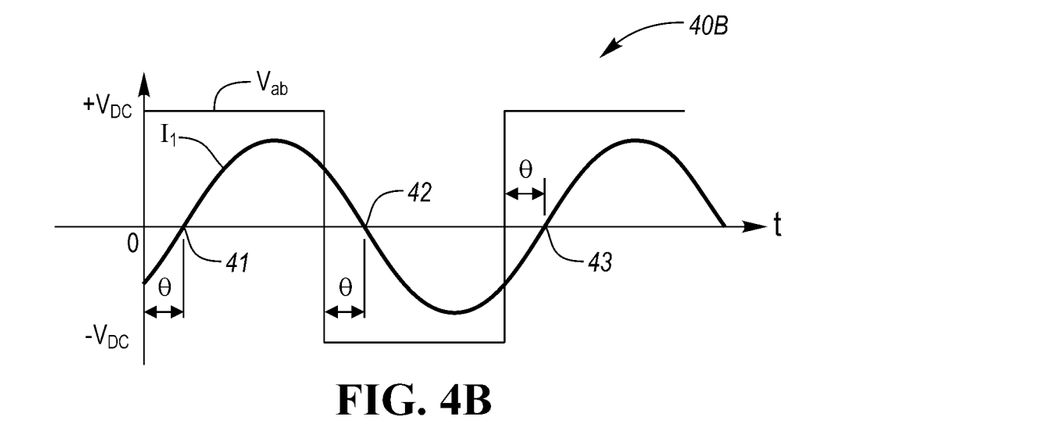
FIG. 4B illustrates a plot showing the voltage and current waveforms of the electrical power flow from the power converter into the resonant network with the current waveform lagging the voltage waveform by a phase angle θ.
Figure 4C:
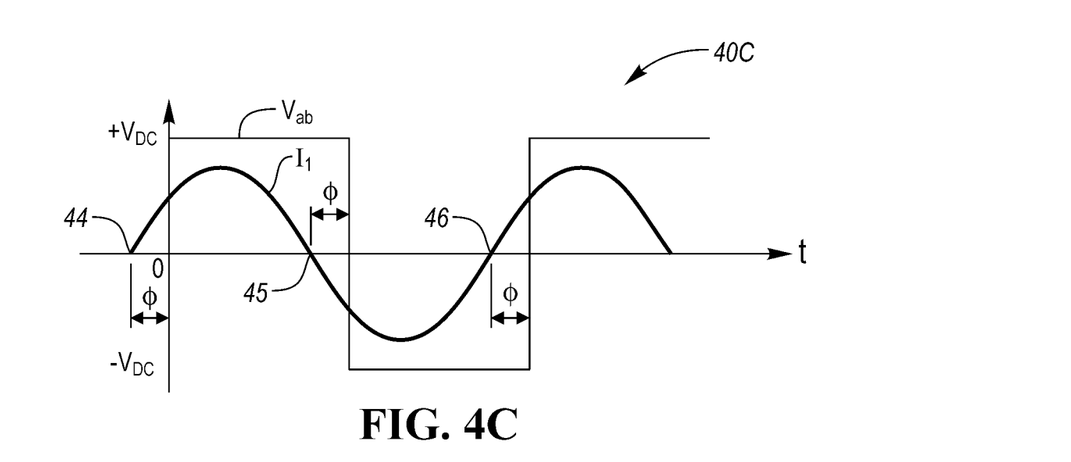
FIG. 4C illustrates a plot showing the voltage and current waveforms of the electrical power flow from the power converter into the resonant network with the current waveform leading the voltage waveform by a phase angle φ.

Referring now to FIGS. 4A, 4B, and 4C, with continual reference to FIG. 3D, plots 40A, 40B, and 40C of voltage $V_{ab}$ and current $I_1$ waveforms outputted from power converter 26 into resonant network 28 are shown, respectively. Switches A, B, C, and D of power converter 26 are controlled to switch on and off according to a schedule based on pulse width modulation (PWM), phase-shift control, etc., to convert the voltage $V_{DC}$ and the current $I_{DC}$ from rectifier 24 into the voltage $V_{ab}$ and the current $I_1$. For instance, switch pair A and D switch on during on a first half period while switch pair B and C is off; and switch pair B and C switch on during a second half period while switch pair A and D is off. This is one cycle. This cycle repeats, for example, on the order of 80-90 kHz for power converter 26 to produce the LF power.

Plots 40A, 40B, and 40C illustrate voltage $V_{ab}$ and current $I_1$ waveforms outputted from power converter 26 over roughly 1.5 of these cycles. For example, with reference to plot 40A shown in FIG. 4A, the voltage $V_{ab}$ is equal to $+V_{DC}$ during the first half period with switch pair A and D on and switch pair B and C off and the voltage $V_{ab}$ is equal to $-V_{DC}$ during the second half period with switch pair A and D off and switch pair B and C on. The voltage $V_{ab}$ switches from $+V_{DC}$ to $-V_{DC}$ back to $+V_{DC}$, etc., as the switch pairs A, D and B, C switch between on and off.

In plot 40A shown in FIG. 4A, the current $I_1$ is completely in phase with the voltage $V_{ab}$. This means that the impedance seen by power converter 26 has no reactance component and is strictly resistive. The current $I_1$ crosses zero exactly when the voltage $V_{ab}$ switches between $+V_{DC}$ and $-V_{DC}$. As such, the current $I_1$ crosses zero exactly when the switch pair A, D switch on and switch pair B, C switch off at time t=0; and the current $I_1$ crosses zero exactly when the switch pair B, C switch on and switch pair A, D switch off at time t=T.

In plot 40B shown in FIG. 4B, the current $I_1$ lags the voltage $V_{ab}$ by a phase angle $\theta$. This means that the impedance seen by power converter 26 has an inductive reactance component. The current $I_1$ crosses zero at zero-current crossover points 41, 42, and 43 which occur, in this example, at the same time after voltage $V_{ab}$ switches between $+V_{DC}$ and $-V_{DC}$. The time period that the current $I_1$ crosses zero after voltage $V_{ab}$ switches between $+V_{DC}$ and $-V_{DC}$ is represented by the phase angle $\theta$ in FIG. 4B. As such, the current $I_1$ crosses zero after the switch pairs A, D and B, C switch between on and off. Consequently, the switching of the switches occurs in the desirable soft-switching mode.

In plot 40C shown in FIG. 4C, the current $I_1$ leads the voltage $V_{ab}$ by a phase angle $\varphi$. This means that the impedance seen by power converter 26 has a capacitive reactance component. The current $I_1$ crosses zero at zero-current crossover points 44, 45, and 46 which occur, in this example, at the same time before the voltage $V_{ab}$ switches between $+V_{DC}$ and $-V_{DC}$. The time period that the current $I_1$ crosses zero before the voltage $V_{ab}$ switches between $+V_{DC}$ and $-V_{DC}$ is represented by phase angle $\varphi$. As such, the current $I_1$ crosses zero before the switch pairs A, D and B, C switch between on and off. Consequently, the switching of the switches occurs in the non-desirable hard-switching mode.

With reference FIG. 3D and plots 40A, 40B, and 40C, when switch pair A and D is switched on the voltage $V_{ab}$ equal to $+V_{DC}$ is fed into resonant network along with the current $I_1$. (Recall the condition that switch pair B and C is off when switch pair A and D is on.) The voltage $V_{ab}$ equaling $+V_{DC}$ means that the voltage $V_{ab}$ is a non-zero value. Thus, power is transferred from power converter 26 into resonant network 28 when switch pair A and D is switched on. In each of plots 40A, 40B, and 40C, switch pair A and D is on during an entire first half period of time. In particular, switch pair A and D is switched on at a start time t=0 and is switched off at an end time t=T/2. Accordingly, power is transferred during the entire (i.e., 100%) first half period of time.

The power transfer time occurs when switch pair A and D is switched on. For example, if switch pair A and D is switched on at a later start time t=T/4 and is switched off at the end time t=T/2, then power is transferred during half (i.e., 50%) of the first half period of time. In particular, power is transferred during a time interval between the start time t=T/4 and the end time t=T/2. As another example, if switch pair A and D is switched on at the start time t=0 and is switched off at an earlier end time t=T/8, then power is transferred during a quarter (i.e., 25%) of the first half period of time. In particular, power is transferred during a time interval between the start time t=0 and the end time t=T/8.

Similarly, when switch pair B and C is switched on the voltage $V_{ab}$ equal to $-V_{DC}$ is fed into resonant network along with the current $I_1$. (Recall the condition that switch pair A and D is off when switch pair B and C is on.) The voltage $V_{ab}$ equaling $-V_{DC}$ means that the voltage $V_{ab}$ is a non-zero value. Thus, power is transferred from power converter 26 into resonant network 28 when switch pair B and C is switched on. In each of plots 40A, 40B, and 40C, switch pair B and C is on during an entire second half period of time. In particular, switch pair B and C is switched on at a start time t=T/2 and is switched off at an end time t=T. Accordingly, power is transferred during the entire (i.e., 100%) second half period of time. The power transfer time depends on when switch pair B and C is switched on.

In sum, the power transfer time (i.e., the power transfer duration) when power is transferred from power converter 26 into resonant network 28 depends on when switch pair A and D is switched on and when switch pair B and C is switched on. The power transfer time can be increased (from 0% to 100% duty ratio) by increasing the duration of which the corresponding switch pair is switched on. Conversely, the power transfer time can be decreased (from 100% to 0% duty ratio) by decreasing the duration of which the corresponding switch pair is switched on. Further, knowledge of the switch timing (such as by controller 37 that controls switches A, B, C, and D) when switch pair A and D is to switch on (i.e., when switch pair A and B is to turn on and then turn off) and when switch pair B and C is to switch on (i.e., when switch pair B and C is to turn on and then turn off) is indicative of the timing when the power transfer is to occur.

Figure 5:
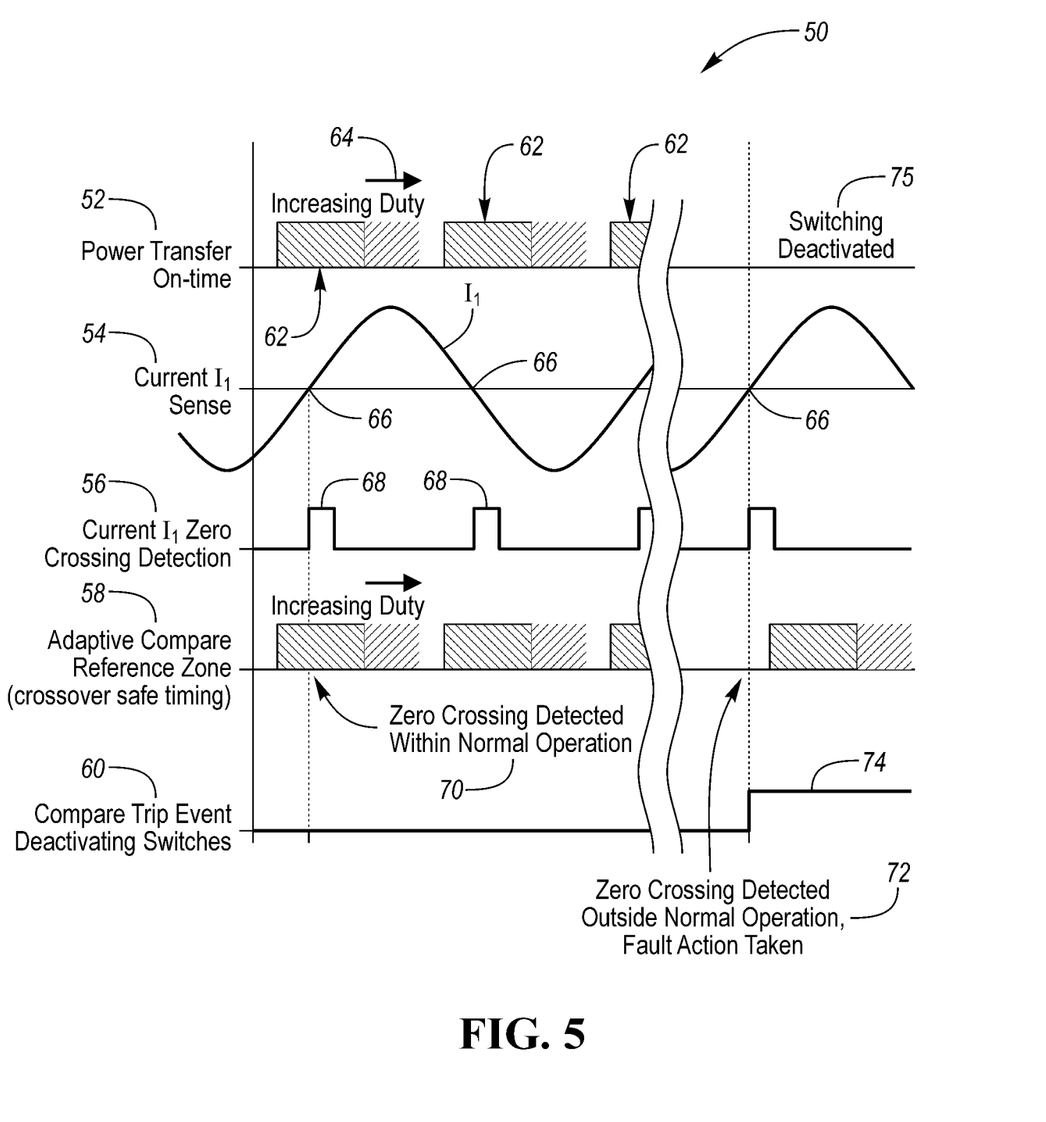
FIG. 5 illustrates a timing diagram of operation of a method of early hard switching detection and protection for the inductive power transfer system.

Referring now to FIG. 5, with continual reference to FIGS. 3D, 4A, 4B, and 4C, a timing diagram 50 of operation of a method of early hard switching detection and protection for inductive power transfer system 10 is shown. Controller 37 carries out the operation of the method. The method protects switches A, B, C, and D of power converter 26 from excessive thermal power dissipation caused by the phase angle of the current $I_1$ fed into resonant network 28 transitioning from a lagging to a leading mode (i.e., caused by the phase angle of the current $I_1$ changing from, for example, the lagging phase angle θ shown in FIG. 4B to the leading phase angle φ shown in FIG. 4C). That is, in terms of switch power dissipation, the method protects the switches from excessive thermal power dissipation caused by the switching mode of operation of the switches transitioning from soft zero-voltage-switching (ZVS) to hard non-zero-switching.

The operation of the method generally includes detecting the zero-current crossover points of the current $I_1$ fed into resonant network 28 and comparing the timing of the zero-current crossover points of the current $I_1$ to the switch timing of the switches of power converter 26. As described above, the switch timing of switch pair A and D and switch pair B and C defines the power transfer timing. The switch timing is known in advanced as controller 37 issues commands to cause switches A, B, C, and D to operate in accordance with the switch timing.

In the operation of the method, when a zero-current crossover point occurs prior to when a power transfer on-time is scheduled (i.e., prior to the time that switch pair A and D or switch pair B and C is to be switched on), power converter 26 is considered to be near or operating in the undesired hard-switching mode. In this case, the method further includes deactivating power converter 26 before the power transfer on-time actually occurs. In this way, power converter 26 and thereby inductive power transfer system 10 are deactivated before any actual hard-switching of the switches of the power converter takes place. On the other hand, when a zero-current crossover point occurs during a power transfer on-time (i.e., after switch pair A and D or switch pair B and C is turned on), power converter 26 is considered to be operating in the desired soft-switching mode. The method has an adaptive dynamic real-time ability that automatically follows the phase-shift power cycle and enacts a relatively fast deactivation.

In FIG. 5, timing diagram 50 includes a power transfer on-time entry 52, a current $I_1$ sense entry 54, a current $I_1$ zero crossing detection entry 56, an adaptive compare reference zone entry 58, and a compare trip events entry 60. Power transfer on-time entry 52 depicts the timing of power transfer on-times 62. As explained, each power transfer on-time 62 occurs when switch pair A and D or switch pair B and C is on. As such, the timing of each power transfer on-time 62 corresponds to the timing of when the corresponding switch pair is switched on and is switched off. As further explained, the duration of each power transfer on-time can be increased (i.e., "Increasing Duty" arrow 64 shown in FIG. 5) or decreased by changing the timing of when the corresponding switch pair is switched on and is switched off.

Current $I_1$ sense entry 54 depicts the current $I_1$ from power converter 26. A current sensor (not shown) associated with controller 37 is configured to detect the current $I_1$ to provide same as part of current $I_1$ sense entry 54. Current $I_1$ sense entry 54 (i.e., the detected current $I_1$) is provided to controller 37 as indicated in FIG. 3D.

Current $I_1$ zero crossing detection entry 56 depicts electric pulses 68 which are generated when the current $I_1$ crosses zero. That is, electric pulses 68 are respectively generated for zero-current crossover points 66. Controller 37 compares the detected current $I_1$ to zero-current value and generates an electric pulse 68 for each instance of the detected current $I_1$ having a zero-current value.

Adaptive compare reference zone entry 58 depicts a comparison between the timing of power transfer on-times 62 and zero-current crossover points 66. Controller 37 carries out the comparison. Controller 37 compares the timing of power transfer on-times 62 with the corresponding zero-current crossover points 66 to confirm whether the zero-current crossover points occur during the power transfer on-times (i.e., to confirm whether the current $I_1$ crosses zero-current after the corresponding switch pair is switched on). For instance, as shown in FIG. 5, the detection of a zero-current crossover point 66 occurring during the timing of a corresponding power transfer on-time 62 is indicated by designation 70. On the other hand, as shown in FIG. 5, the detection of a zero-current crossover point 66 occurring prior to the time that a corresponding power transfer on-time 62 is scheduled to occur is indicated by designation 72 (i.e., the current $I_1$ crosses zero current before the corresponding switch pair is scheduled to be switched on).

Compare trip events entry 60 depicts a deactivation control signal 74. Controller 37 generates deactivation control signal 74. When enabled (e.g., when high) deactivation control signal 74 deactivates switches A, B, C, and D so that the switches cannot be switched on and instead remain off. As indicated in FIG. 5, deactivation control signal 74 is enabled upon the detection of a zero-current crossover point 66 occurring prior to the time that a corresponding power transfer on-time 62 is scheduled to occur. Deactivation of switches A, B, C, and D disables power transfer from occurring as indicated by designation 75.

Figure 6:
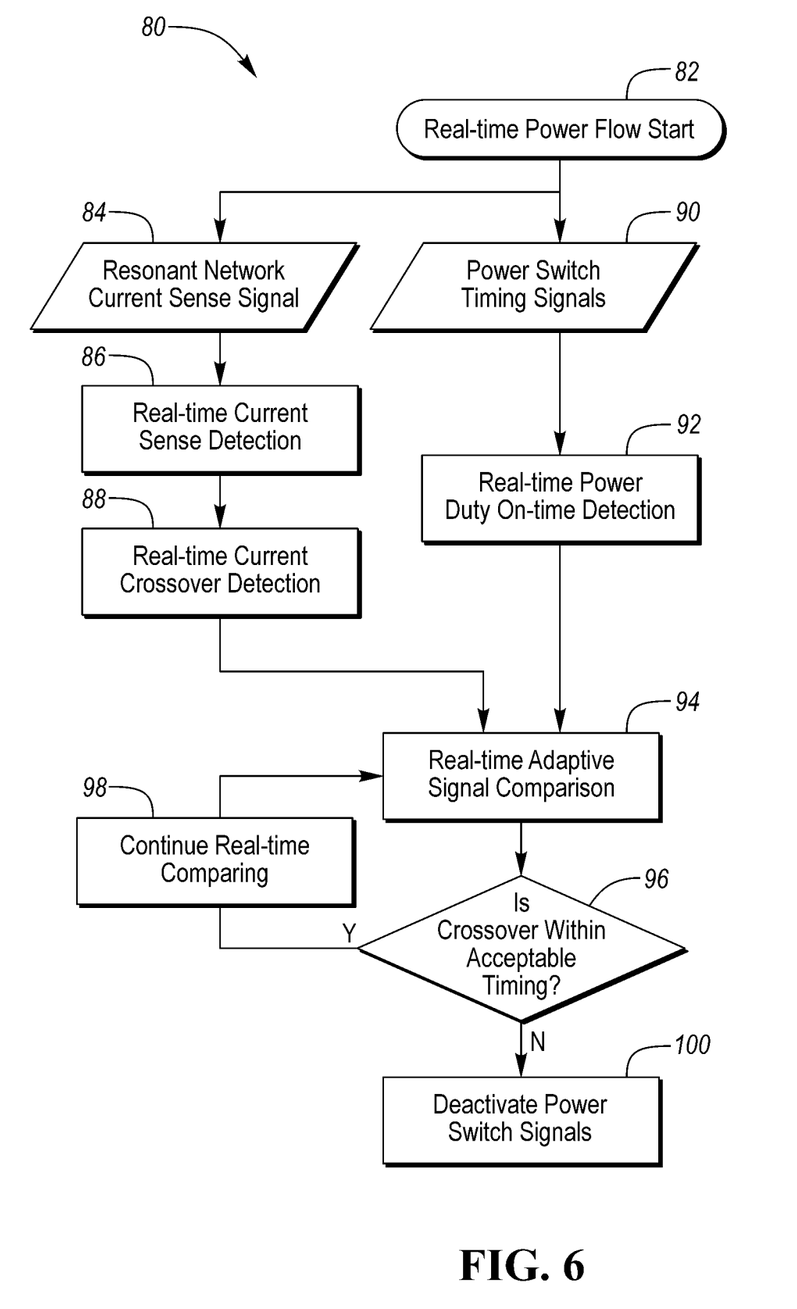
FIG. 6 illustrates flowchart describing the operation of the method of early hard switching detection and protection for the inductive power transfer system.

Referring now to FIG. 6, with continual reference to FIGS. 3D, 4A, 4B, 4C, and 5, a flowchart 80 describing the operation of the method of early hard switching detection and protection for inductive power transfer system 10 is shown. The operation begins with the commencement of a real-time power flow from power converter 26 to resonant network 28 as indicated in block 82. On one hand, the current $I_1$ is output from power converter 26 into resonant network 28 as indicated in block 84; the current $I_1$ is detected by the current sensor and provided to controller 37 as indicated in block 86; and controller 37 compares the current $I_1$ to zero value to detect the zero-current crossover point 66 as indicated in block 88.

On the other hand, controller 37 is programmed with the timing schedule of when switch pairs A and D and B and C are to be switched on as indicated in block 90; and controller 37 detects the timing of power transfer on-times 62 from the timing schedule of the switches as indicated in block 92. Controller 37 then compares the timing of a power transfer on-time 62 and a corresponding zero-current crossover point 66 as indicated in block 94 to determine whether the zero-current crossover point occurs during the power transfer on-time as indicated in decision block 96. If the zero-current crossover point occurs during the power transfer on-time, then the switches of power converter 26 are operating in the desired soft-switching mode. This comparison then continues with the following cycles of the power transfer on-times and the corresponding zero-current crossover points as indicated by designation 98. As long as the switches of power converter 26 are operating in the desired soft-switching mode the operation of inductive power transfer system 10 continues.

If controller 37 in decision block 96 determines that a zero-current crossover point has occurred prior to the scheduled time that a corresponding power transfer on-time is to occur (i.e., the current $I_1$ crosses zero current before switch pair A and B or switch pair B and C is scheduled to be switched on), then the controller prevents the corresponding power transfer-on time from occurring. More particularly, as indicated in block 100, controller 37 deactivates the switches of power converter 26 so that the switches cannot be switched on and instead remain off. In this way, power converter 26 is deactivated before actual hard switching of the switches occurs.

An inductive power transfer system as described herein employs a method for early hard switching detection and protection. The method is employed to protect the system from operating in damaging modes of operation. Moreover, the protection feature of the process allows for a reduction in antenna size and allows for a more aggressive balancing between resonant tuning (Q)/coupling factor/antenna size/antenna offset range/voltages/switch types/etc. which could not be accomplished in a non-phase protected system. In contrast, previous inductive power transfer systems need to have a balance between their resonant tuning (Q), antenna coupling, antenna number of turns, antenna size, antenna offset ranges, and transistor switch types that can automatically start and operate in non-damaging modes of operation. This results in a large physical form factor for the inductive power transfer antennas over a small antenna separation offset range.

Further, the method for early hard switching detection and protection for inductive power transfer protects against catastrophic failure modes of operation in which severe thermal power dissipation is caused due to hard switching of the switch transistors and/or large reverse currents through the switch transistors exceeding switch transistor device limitations. The method also allows for the safe use of smaller inductive power transfer antennas. The smaller antenna size uses less material therefore improving the device's weight, cost, manufacturability, and form factor. The method also allows for the use of less expensive and more readily available transistors for the power converter switches.

In sum, the method for early hard switching detection and protection prevents higher power dissipation operation by deactivation of power flow when hard switching is imminent. This result may signal the user to reposition the antennas for optimal low power loss operation. This is done instead of the alternative scenario of unknowingly operating the inductive power transfer system in an unchecked, high power dissipation mode.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for inductive power transfer, the system comprising:
 a power converter including a plurality of switches;
 a controller programmed with a schedule having scheduled times of when the switches are to be switched for the power converter to output a voltage and a current to a resonant network and the controller knowing the schedule in advance of when the switches are to be switched according to the schedule, the controller to switch the switches according to the schedule to cause the power converter to output the voltage and the current to the resonant network; and
 the controller to compare a zero-current crossover point of the current and the schedule to determine whether the zero-current crossover point occurs prior to a scheduled time of the schedule that one or more of the switches are be switched and to disable the switches from switching, at least at the scheduled time, when the zero-current crossover point occurs prior to the scheduled time such that the switches do not switch at the scheduled time thereby preventing hard switching of the switches from occurring.

2. The system of claim 1 wherein:
the controller to confirm that soft switching of the one or more of the switches is occurring when the zero-current crossover point occurs after the scheduled time that the one or more of the switches are switched.

3. The system of claim 1 wherein:
the scheduled time includes a start time that the one or more of the switches are switched on and an end time that the one or more of the switches are switched off.

4. The system of claim 1 wherein:
the power converter includes a full-bridge circuit having four switches.

5. The system of claim 1 wherein:
the power converter includes a half-bridge circuit having two switches.

6. The system of claim 1 wherein:
the switches are transistor switches.

7. The system of claim 1 wherein:
the switches are MOSFET switches.

8. A method for inductive power transfer for use with a power converter including a plurality of switches, the method comprising:

programming a controller with a schedule having scheduled times of when the switches are to be switched for the power converter to output a voltage and a current to a resonant network such that the controller knows the schedule in advance of when the switches are to be switched according to the schedule;

switching, by the controller, the switches of the power converter according to the schedule;

comparing a zero-current crossover point of the current and the schedule and detecting that the zero-current crossover point occurs prior to a scheduled time of the schedule that one or more of the switches are be switched; and disabling the switches from switching, at least at the scheduled time, in response to the zero-current crossover point occurring prior to the scheduled time such that the switches do not switch at the scheduled time thereby preventing hard switching of the switches from occurring.

9. The method of claim 8 further comprising:
confirming that soft switching of the one or more of the switches is occurring when the zero-current crossover point occurs after the scheduled time that the one or more of the switches are switched.

10. The method of claim 8 wherein:
the scheduled time includes a start time that the one or more of the switches are switched on and an end time that the one or more of the switches are switched off.

* * * * *